United States Patent [19]

Tremblay

[11] Patent Number: 4,685,691
[45] Date of Patent: Aug. 11, 1987

[54] TRAILER FOR A TWO-WHEELED VEHICLE

[76] Inventor: Ronaldo Tremblay, 261 Du Parc Street, Cap-de-la-Madeleine, Province of Quebec, Canada, G8V 1V2

[21] Appl. No.: 870,408
[22] Filed: Jun. 4, 1986
[51] Int. Cl.⁴ .............................................. B62K 27/12
[52] U.S. Cl. .................................. 280/204; 280/656; 280/402
[58] Field of Search ............... 280/204, 656, 203, 202, 280/402

[56] References Cited
U.S. PATENT DOCUMENTS 3,549,165  12/1970  Zuhlke .
4,350,359   9/1982  Van Gompel ...................... 280/203

Primary Examiner—John J. Love
Assistant Examiner—Donn McGiehan

[57] ABSTRACT

This trailer comprises a U-shape load-carrying casing with a hitching bar across the free ends of the legs of the casing. The center of said cross-bar is hitched to the vehicle between the two wheels thereof by means of a universal joint hitch. The load carrying casing extends on both sides of the vehicle and across the back thereof. Two wheels support the back of the casing. The universal hitch enables the vehicle, such as a motorcycle, to roll, rotate or pitch relative to the trailer, such as when taking curves and/or riding on bumpy roads of grade and down-grade. The hitch is positioned below the horizontal plane passing through the vehicle axles and in front of the center of gravity of the vehicle. The trailer and vehicle assembly is very stable both while riding and braking. Also, the portions of the casing extending on both sides of the vehicle constitute a protection for the vehicle rider and passenger.

3 Claims, 5 Drawing Figures

TRAILER FOR A TWO-WHEELED VEHICLE

FIELD OF THE INVENTION

This invention relates to a trailer for a two-wheeled vehicle, such as a motorcycle, a bicycle, a moped and the like two-wheeled vehicles in which the two wheels are in the vertical longitudinal plane of the vehicle.

BACKGROUND OF THE INVENTION

It is known to provide trailers for motor vehicles and the like consisting of a casing mounted on two wheels disposed side by side and having a central towing bar, the front end of which is hitched to the rear end of the two-wheeled vehicle. These rearwardly-located trailers have a general tendency to render a ride with a motorcycle much more dangerous: for instance, during emergency braking, the tow-bar exerts a push on the vehicle which can cause a dangerous jack-knife effect. Such known trailers have also a limited load-carrying capacity.

OBJECTS OF THE INVENTION

The main object of the invention is to provide a trailer for a motorcycle which may concurrently carry an elongated load and shield the rider and passenger thereof against severe injuries from lateral impact with an obstacle or ground.

An important object of the present invention is to increase the stability of the motorcycle connected to said trailer relative to that of same motorcycle without said trailer or with a conventional trailer.

A further noticeable object of this invention is to reduce the disadvantages related to the addition of a trailer about a motorcycle: i.e. in braking, maneuvering and roadhandling, traction (acceleration and deceleration), and the overall cumbersome resulting length.

Other objects of the invention are to reduce the severity of injuries to the rider and passenger from rearward impact on the above trailer and motorcycle assembly, to prevent side slipping of the front wheel and, generally speaking to render the motorcycle more visible on the road for increased safety.

SUMMARY OF THE INVENTION

The disclosed trailer is designed for a two-wheeled vehicle of the type in which the two wheels are disposed one behind the other. The trailer includes a rectangular trailer frame which defines a front frame member, side frame members and a rear frame member. The front frame member is adapted to extend transversely between the two wheels of the vehicle. The rear frame member is adapted to extend rearwardly of the rear wheel of the vehicle. hitching means are provided for releasably hitching the front frame member to a portion of the frame of the vehicle located between its two wheels and this hitching means constitutes a universal joint. The two side frame members form load carrying casings adapted to extend spacedly laterally on the opposite sides of the vehicle. The trailer rear portion is fitted with a transverse two-wheeled axle. The point of attachment of the hitching means is positioned below the horizontal plane passing through the two vehicle wheel axles and preferably also forwardly of the vehicle center of gravity. The rear frame member preferably also forms a load carrying casing which can be made of several detachable sections so as to vary the overall width of the trailer to suit specific requirements.

Seats may be provided in the trailer to accommodate additional passengers. The trailer may be used in association with a foldable tent, the canopies serving as closure for the casings can be replaced by a single large transparent sheet extending over the vehicle itself to protect the rider and passenger against inclement weather. The trailer can be designed to fit a motorcycle, a bicycle, a moped and the like.

BRIEF DESCRIPTION OF THE DRAWINGS

In the drawings, like reference characters indicate like elements throughout.

DETAILED DESCRIPTION OF A PREFERRED EMBODIMENT OF THE INVENTION

Figure 2:
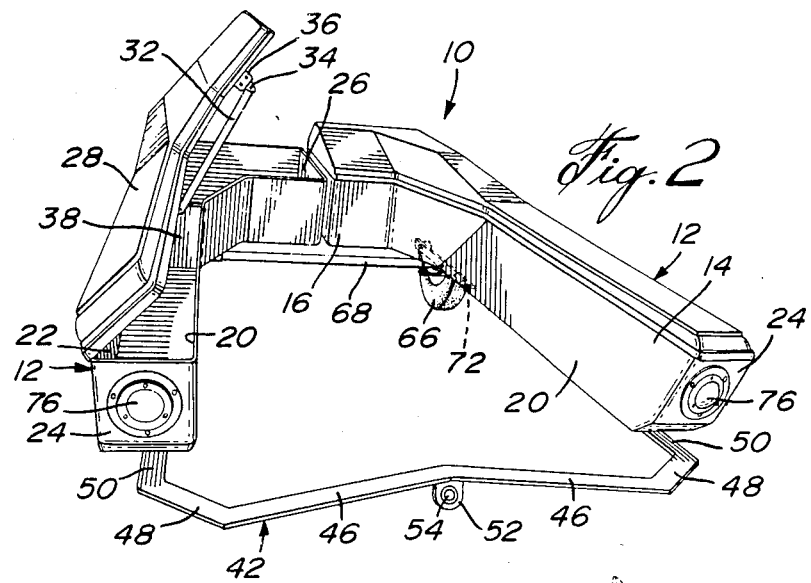
FIG. 2 is a perspective view of the trailer of FIG. 1, with the right-hand canopy in open position.
Figure 1:
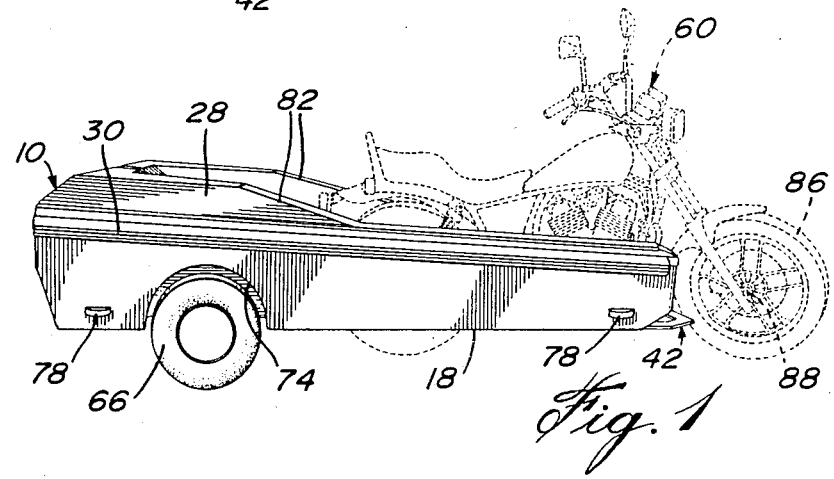
FIG. 1 is a side elevation of the trailer hitched to a towing motorcycle shown in phantom lines.
Figure 3:
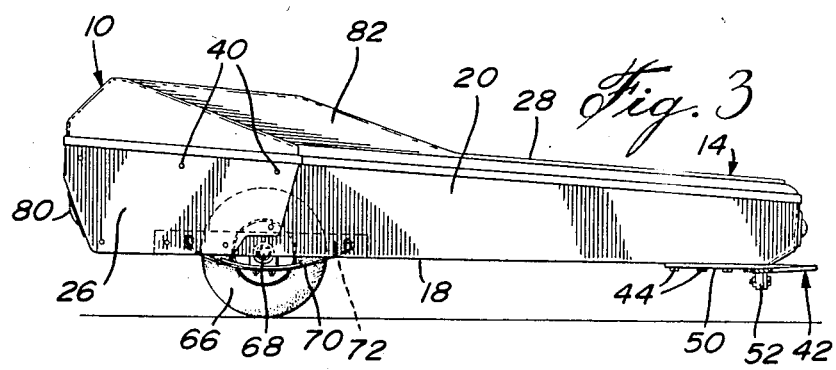
FIG. 3 is a central longitudinal section of the trailer of FIG. 1.

The trailer 10, shown in FIGS. 1, 2 and 3, comprises two generally L-shape mirror-image casings 12. Each casing defines a main leg 14 and a smaller transverse leg 16. Each casing 12 has a floor 18, an inner wall 20, an outer wall 22, a front transverse wall 24, and a back wall 26 defining a through-like arrangement. A closure, or canopy 28, also of L-shape, is designed to close the top open end of the casing 12. The canopy 28 is hinged by means, for instance, of a piano hinge 30 to the top edge of the outer wall 22 of the main leg 14 of the casing 12. As shown in FIG. 2, each canopy 28 can be maintained in open position by means of a rod 32, the upper end of which is pivoted at 34 to a bracket 36 fixed to the underside of canopy 28. The stay rod 32 is folded against the underside of the shorter transverse leg of the canopy 28 in its storage position to allow closure of the canopy. The lower end of stay rod 32 is adapted to rest on the top edge of a partition 38 of the casing. The two L-shape casings 12 are assembled by means of bolts and nuts passing through holes 40 (see FIG. 3) extending through the back transverse walls 26 in such a manner that the main legs 14 will extend in spaced parallel relationship with the transverse legs 16 of the casing in an abutment and forming the transverse back portion of the trailer.

Each casing 12 and each canopy 28 are preferably molded of synthetic resin reinforced with glass fibers. A tow-bar 42 extends across the front end of the two L-shape casings 12, being secured to the underside of the floor 18 of each casing as by bolts 44, as shown in FIG. 3.

Figure 5:
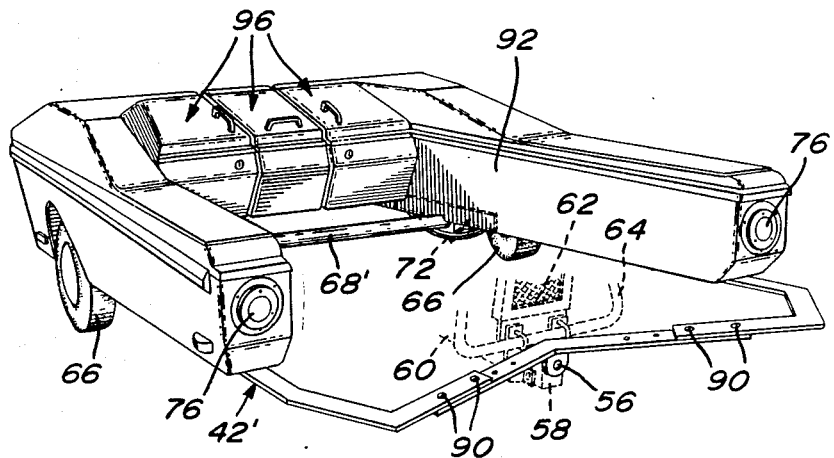
FIG. 5 is a perspective view of the second embodiment showing an extra casing compartment and also showing the hitching means as attached to the motorcycle frame, the latter shown in phantom lines.

The tow-bar 42 has a central forwardly-outwardly diverging V-shape portion 46, the outer ends of which are extended by angular portions 48, in turn extended by end portions 50, the two portions 50 extending forwardly beyond the level of the apex of portion 46 and being parallel to each other and secured to the respective casing 12. The tow-bar 42 is of symmetrical shape. The apex of the central V-shape central portion 46 carries a downwardly-extending bracket 52, in which is mounted a ball-shape bushing 54, which can rotate in all directions within the bracket 52. Rotary bushing 54 is adapted to slidably receive a stud 56 which is firmly secured to and protrudes forwardly from the front end of the engine block 58 of a motorcycle 60, just beneath the radiator 62 and the crash bar 64 of said motorcycle. This is shown in FIG. 5.

When bushing 54 is positioned over stud 56, the latter protrudes forwardly of the bushing and is locked thereto by suitable means, such as a cotter pin, extending through a transverse hole of the projection portion of stud 56.

The trailer 10 is provided at the back thereof with a pair of trailer wheels 66 mounted for free rotation at the ends of a transverse tubular axle 68, in conventional manner, said axle 68 being carried by the center of a leaf spring suspension 70, the outer ends of which fitted with conventional shackles pivotally attached to brackets in the usual manner, fixed to the underside of a recessed floor portion 72 of each main leg 14. This recessed floor portion 72 extends on each side of wheel well 74 for accommodating each wheel 66. Each wheel well 74 and the adjacent floor portion 72 extend inwardly within the respective casing 12.

The front wall 24 of each casing 12, together with its outer wall 22, can be provided in conventional manner with light reflectors 76 and 78, respectively. Traffic lights 80 can be mounted at the back of the trailer energized by wiring connected to the motorcycle battery, and which may extend within the casing and along the tow bar 42. The whole trailer assembly may have an aerodynamic shape increasing in height from front to back, as shown, and with the canopies 28 forming tapered surfaces 82. Preferably, for better rigidity, the junction between the inner wall sections of the main leg 14 and transverse leg 16 is defined by an inclined junction wall portion.

The assembly of the trailer wheels 66, axle 68 and leaf springs 70 can be detached from the two casings 12 and the two casings 12 detached at their connection through holes 40. Similarly, the tow-bar 42 can be detached at its bolts 44 and the various parts can be stored away in a minimum storage space. With trailer 10 in assembled condition, the assembly of the two L-shape casings 12 with the tow-bar 42 forms a rectangular frame with the sides of the frame defining casings for carrying loads and especially elongated loads, and with also the rear transverse portion of the frame forming load-carrying casings.

The motorcycle 60 is partly inserted between the side casings, with the tow-bar 42 extending just rearwardly of the front wheel 86 of the motorcycle. The hitch arrangement formed by rotary bushing 54 and stud 56 defines a universal joint hitching means and the point of attachment of said hitching means to the motor vehicle is located below a horizontal plane extending through the front and back wheel axles 88 of the motorcycle 60. Also, this point of attachment is forwardly of the center of gravity of the motorcycle.

The spacing between the two main legs 14 of the U-shape casing is sufficient to permit free turning movement of the motorcycle with respect to the trailer. Also, the universal joint hitch permits pitching and rolling movement of the motorcycle with respect to the trailer. Therefore, the assembly of the motorcycle and trailer can negotiate any kind of road conditions, including upgrade, downgrade and enables lateral tilting of the motorcycle in conventional manner in a turn. As shown in FIG. 1, the trailer extends forwardly of the motorcycle on each side thereof up to the front wheel of the motorcycle. The trailer is very visible on the road, constituting greater safety for the motorcycle driver and his passenger, if any.

Because the universal joint hitch is located ahead of the center of gravity of the motorcycle 60, there will be no jack-knife effect produced on the assembly of the trailer and motorcycle during braking. Also, there will be no tendency to rearwardly overturn the motorcycle during braking, because the forward push exerted by the tow-bar 42 on the motorcycle is located below the plane joining the two wheel axles 88 of the motorcycle forward of the center of gravity, and also below the horizontal plane passing through the trailer wheel axle 68, and because the flooring 18 is horizontal.

Obviously, a foldable tent arrangement could be erected over the trailer 10; the motorcycle being detached from the trailer, the tent having a central pole and attached to the outer wall 22 of the U-shape casing. Also, a transparent sheet could be used to cover the assembly of the motorcycle and trailer, together with the driver and passenger of the motorcycle.

Figure 4:
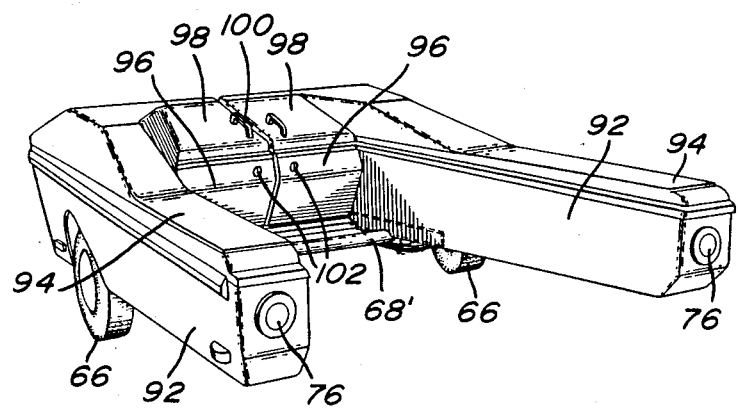
FIG. 4 is a perspective view of a second embodiment but with the transverse hitching bar removed.

FIGS. 4 and 5 show a second embodiment in which the spacing between the two legs of the U-shape casing assembly can be modified to suit specific requirements, for instance, to suit various sizes of equipped motorcycles.

The tow-bar 42' has the same shape as the tow-bar 42 of the first embodiment, except that it is made of three sections telescopically and adjustably interconnected by bolts 90. The tubular axle 68' of the trailer wheels is also made of two telescopic sections. The L-shape casings 12 are replaced by an assembly of elongated casings 92 with their respective canopies 94, and the rear transverse part of the trailer casing is formed of separate casing compartments 96 bolted one to another and also to the side casings 92 by means of bolts and nuts passing through spaced holes made in the abutting walls of the compartments in a manner similar to that shown by the holes 40 of FIG. 3.

Each compartment 96 has its own top closure or canopy 98, which may be provided with handles 100 to open the same and which can be locked in closed position by barrel locks 102.

A comparison of FIGS. 4 and 5 shows that in FIG. 4 there are two compartments 96, while in FIG. 5 there are three such compartments, whereby the same trailer arrangement has been widened. Preferably, elastomeric spacers are disposed around the bolts interconnecting the compartments 96. Similar spacers are arranged between the compartment end walls surrounding the bolts passing through the holes 40 in the first embodiment.

It is apparent that elongated loads can be carried in the side casings; that these side casings constitute a protection against injury in a lateral collision. The motorcycle rides with the same freedom of movement as a motorcycle without any trailer hitched thereto. Smaller-size trailers in accordance with the principle of the invention could be made to be used in association with a bicycle, a moped and other two-wheeled vehicles provided with longitudinally-aligned front and back wheels.

What I claim is:

1. In combination, a two-wheeled motorcycle and a trailer to be towed by the motorcycle; said trailer comprising a generally rectangular rigid frame including a front bar member; elongated load-carrying side casings and a load-carrying rear casing; said front bar member secured to the underside of said side casings and defining and intermediate flattened V-shaped section, transversely extending between the motorcylce engine block and its front wheel, and the legs of which are forwardly outwardly diverging; a transverse two-wheel axle mounted under said rear casing portion, for supporting the side casings and rear casing portion spacedly above the ground and around the motorcycle; the rearwardly-directed apex of said bar V-shaped portion detachably connected by a universal joint connector to said motorcycle just ahead of said engine block for relative movement of said trailer and motorcycle about pitch and roll axes; said connector being located below said bar V-shaped portion and the horizontal plane passing through the axles of the two motorcycle wheels with the motorcycle being in upright position, and forward of the center of gravity of the motorcycle.

2. The motorcycle and trailer combination as defined in claim 1, wherein said casings and rear casing have covers which are forwardly downwardly inclined when the flooring of said casings is in horizontal position, to constitute an air foil.

3. the motorcycle and trailer combination as in claim 2, with the motorcycle further including a front crash bar mounted about the front of said engine block, the trailer front bar member further including a pair of side legs, each frontwardly projecting from the front portion of a corresponding side casing flooring, and corresponding forwardly inturned legs each connecting one bar side leg to the outer end of a corresponding V-shaped section leg; said crash bar adapted to freely sweep through the two interior cavities defined by said front bar member legs when the motorcycle becomes inclined and when taking a turn.

* * * * *